United States Patent
Chitvuttichot et al.

(10) Patent No.: US 12,502,675 B2
(45) Date of Patent: Dec. 23, 2025

(54) APPARATUS TO WASH AND HYDRATE RICE FOR PRODUCTION OF FLOUR AND STARCH

(71) Applicants: CORN PRODUCTS DEVELOPMENT, INC, Westchester, IL (US); INGREDION (THAILAND) CO., LTD., Samutprakarn (TH); INGREDION GERMANY GMBH, Hamburg (DE)

(72) Inventors: Samatcha Chitvuttichot, Bridgewater, NJ (US); Jaco Grobler, Bridgewater, NJ (US); Bradley Johnson, Bridgewater, NJ (US); Nils Kilgast, Bridgewater, NJ (US); Tippayachat Kulpattarapoke, Bridgewater, NJ (US); Sarfaraz Patel, Bridgewater, NJ (US)

(73) Assignees: Corn Products Development, Inc., Westchester, IL (US); Ingredion Germany GmbH, Hamburg (DE); Ingredion (Thailand) Co., Ltd., Samutprakarn (TH)

( * ) Notice: Subject to any disclaimer, the term of this patent is extended or adjusted under 35 U.S.C. 154(b) by 723 days.

(21) Appl. No.: 17/780,222

(22) PCT Filed: Nov. 24, 2020

(86) PCT No.: PCT/US2020/062038
§ 371 (c)(1),
(2) Date: May 26, 2022

(87) PCT Pub. No.: WO2021/113124
PCT Pub. Date: Jun. 10, 2021

(65) Prior Publication Data
US 2023/0016006 A1 Jan. 19, 2023

Related U.S. Application Data (60) Provisional application No. 62/943,355, filed on Dec. 4, 2019.

(51) Int. Cl.
*B02B 1/04* (2006.01)
*B01D 21/26* (2006.01)
(Continued)

(52) U.S. Cl.
CPC .............. *B02B 1/04* (2013.01); *B01D 21/267* (2013.01); *B02B 5/02* (2013.01); *B04C 11/00* (2013.01); *B08B 3/04* (2013.01); *C12C 1/02* (2013.01)

(58) Field of Classification Search
CPC .... B02B 1/04; B02B 5/02; C12C 1/02; A23L 7/196; A23L 5/20; A23L 5/55;
(Continued)

(56) References Cited

U.S. PATENT DOCUMENTS 2,829,771 A * 4/1958 Dahlstrom ................ B04C 5/18
209/730
3,347,372 A * 10/1967 Bouchillon ............. B04C 5/081
55/459.1

(Continued)

FOREIGN PATENT DOCUMENTS

CN 111163674 A * 5/2020 ......... A47L 15/0057
GB 1238725 A 7/1971
(Continued)

OTHER PUBLICATIONS

English translation of patent publication CN11163674A, published May 15, 2020 (Year: 2020).*
(Continued)

*Primary Examiner* — Joseph W Drodge
(74) *Attorney, Agent, or Firm* — Jason Grauch (57) ABSTRACT

A grain food product washing and hydrating system includes a mass-flow designed vessel. The vessel includes an upper
(Continued)

wash section in the form of a cylinder. The wash section receives the grain food product and mixes the same with a fluidized liquid in a turbulent flow. Excess fluid is recycled. The washed grain food product then moves towards a frustoconical-shaped hydration section, where a treated liquid hydrates the grain food product. The shape of the hydration section allows for the mass-flow movement of the grain food product, which ensures continuous flow and enough residence time to hydrate the grain food product, before metering out the same for further processing.

17 Claims, 7 Drawing Sheets

(51) Int. Cl.
| | | |
|---|---|---|
| *B02B 5/02* | (2006.01) | |
| *B04C 11/00* | (2006.01) | |
| *B08B 3/04* | (2006.01) | |
| *C12C 1/02* | (2006.01) | |

(58) Field of Classification Search
CPC .... A23L 5/57; A23B 4/18; A23B 4/26; A23B 4/28; A23B 4/30; B08B 3/00; B08B 3/02; B08B 3/022; B08B 3/04; B08B 3/08; B08B 3/10; B01D 21/267; B04C 11/00
USPC .............................. 99/516; 210/512.1, 512.3
See application file for complete search history.

(56) References Cited

U.S. PATENT DOCUMENTS

| | | | | |
|---|---|---|---|---|
| 4,297,111 | A * | 10/1981 | Ross | B01D 53/18 95/220 |
| 4,960,525 | A * | 10/1990 | Dalby | B01D 21/34 209/729 |
| 5,447,742 | A * | 9/1995 | Malvido | A23L 7/117 426/456 |
| 5,699,726 | A * | 12/1997 | Gupta | B02B 1/04 134/91 |
| 2010/0226722 | A1 | 9/2010 | Walker | |
| 2014/0230859 | A1* | 8/2014 | Dahlquist | C11D 7/16 510/218 |
| 2016/0029844 | A1* | 2/2016 | Pineda | B01F 35/32 366/147 |

FOREIGN PATENT DOCUMENTS

| | | | | |
|---|---|---|---|---|
| HU | 223060 | B1 * | 3/2004 | ............. A23L 7/196 |
| KR | 20100016131 | A * | 2/2010 | ................ C02F 1/38 |
| WO | 0057722 | A1 | 10/2000 | |

OTHER PUBLICATIONS

English translation of Howdeshell Publication KR-20100016131-A, Feb. 12, 2010 (Year: 2010).*

* cited by examiner

APPARATUS TO WASH AND HYDRATE RICE FOR PRODUCTION OF FLOUR AND STARCH

CROSS-REFERENCE TO RELATED APPLICATIONS

This application is a US National Stage under 35 USC § 371 of International Application No. PCT/US2020/062038, filed Nov. 24, 2020, which claims priority to U.S. Provisional Application Ser. No. 62/943,355, filed Dec. 4, 2019, which are incorporated herein by reference in all its entirety for all purposes.

Aspects of the present disclosure include systems, methods, and/or apparatus for the washing and hydrating of starch food products. More particularly, but not exclusively, aspects may include systems, methods, and/or apparatus for the continuous washing and hydrating of starch food products, including, but not limited to, rice used in the production of flour and starch.

Commonly, during rice starch and/or rice flour production, broken or whole grain rice is soaked in water, softening the rice grain to minimize starch damage during processing and to promote fine milling. The soaking step is performed in batch mode (i.e., batch soaking) where pre-washed rice is filled in multiple tanks and hydrated with water for 2-4 hours. Commonly, batch processing requires significant water use and complex batch operations of filling, air scouring, water draining, water recycle, and rice draining.

It is another object, feature, and/or advantage of any of the embodiments of the present disclosure to minimize the hydration time and process complexity for food products.

It is still another object, feature, and/or advantage of any of the embodiments of the present disclosure to ensure steady-state cleaning and hydration of food products, such as rice.

It is yet another object, feature, and/or advantage of any of the embodiments of the present disclosure to reduce the water consumption, labor, and/or equipment requirements associated with hydration and/or washing of food products.

It is still a further object, feature, and/or advantage of any of the embodiments of the present disclosure to improve the millability of food product as part of the processing of the food product.

It is a further object, feature, and/or advantage of any of the embodiments of the present disclosure to use mass flow for washing and hydrating food product in order to provide constant residence time and stable outlet moisture.

It is another object, feature, and/or advantage of any of the embodiments of the present disclosure to control bacteria during hydration of the food product.

It is yet another object, feature, and/or advantage of any of the embodiments of the present disclosure to recycle water used for washing and hydration of food product.

The previous objects, features, and/or advantages of the present invention, as well as the following aspects and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to any aspects of the present disclosure, a system for washing and hydrating food product includes a vessel, comprising a washing section including an inlet to receive the food product a hydration section adjacent the washing section, said hydration section being generally frustoconical, and a metered outlet. The system further includes a liquid inlet and air inlet operatively connected to the washing section of the vessel to add an air and liquid mixture thereto, wherein the air and liquid mixture flow in a countercurrent direction relative to the food product in the vessel to wash the food product.

According to any of the embodiments disclosed, the generally frustoconical shape of the hydration section of the vessel comprises walls angled at between about 45 degrees to about 90 degrees.

According to any of the embodiments disclosed, the walls are angled at about 80 degrees.

According to any of the embodiments disclosed, the food product moves through the hydration section in a continuous, mass-flow manner.

According to any of the embodiments disclosed, the washing section comprises a generally cylindrical shape.

According to any of the embodiments disclosed, the washing section comprises an outflow port including a screen.

According to any of the embodiments disclosed, the liquid and air inlet comprises compressed air injection nozzles.

According to any of the embodiments disclosed, the system further comprises a hydrating liquid inlet operatively connected to the hydrating section of the vessel, the hydrating liquid comprising treated water.

According to any of the embodiments disclosed, the treated water comprises a mixture of water and food-grade biological inhibitors.

According to any of the embodiments disclosed, the metered outlet of the vessel comprising a metering valve.

According to any of the embodiments disclosed, at least the hydration section of the vessel includes walls polished or coated on an inner surface to reduce friction of the food product moving therein.

According any aspects of the disclosure, a method for washing and hydrating a food product comprises adding food product to a wash chamber of a vessel, introducing a flow of fluidized water to the wash chamber of the vessel in a countercurrent flow as the food product moves towards a hydration chamber of the vessel, introducing a treated water to the food product in the hydration chamber as the food product moves in a mass flow manner through the hydration chamber, and metering a flow of the food product out an outlet of the vessel.

According to any of the embodiments disclosed, the method includes recycling the fluidized water from the wash chamber by passing the fluidized water through an outlet in the wash chamber, said outlet including a screen.

According to any of the embodiments disclosed, the method includes adding one or more biological inhibitors to the treated water that is introduced to the food product in the hydration chamber.

According to any of the embodiments disclosed, the method includes that the hydration chamber comprises a vertical frustoconical column to allow for the continuous, mass-flow controlled movement of the food product.

According to any of the embodiments disclosed, the method includes dewatering and washing the food product that has been metered out the outlet of the vessel before further processing of the food product.

According to any of the embodiments disclosed, a vessel comprises a generally vertical chamber having a wash section at least partially above a hydration section, wherein the wash section comprises an inlet for receiving a food product and an inlet for introducing a fluidized liquid into the wash section to create a turbulent flow therein, and wherein the hydration section comprises a generally frustoconical shape having a larger diameter at an upper portion adjacent the wash section for receiving the washed food product, a smaller diameter opposite the wash section at an outlet of the hydration section, and a treated liquid inlet for introducing a treated liquid into the hydration section.

According to any of the embodiments disclosed, the generally frustoconical shape of the hydration section of the vessel comprises walls angled at between about 45 degrees to about 90 degrees.

According to any of the embodiments disclosed, the walls are angled at about 80 degrees.

According to any of the embodiments disclosed, the wash section is generally cylindrical in shape and includes a screened outlet port.

These and/or other objects, features, advantages, aspects, and/or embodiments will become apparent to those skilled in the art after reviewing the following brief and detailed descriptions of the drawings.

Several embodiments are illustrated and described in detail, wherein like reference characters represent like components throughout the several views. The drawings are presented for exemplary purposes and may not be to scale, unless otherwise indicated, and thus proportions of features in the drawings shall not be construed as evidence of actual proportions.

The following definitions and introductory matters are provided to facilitate an understanding of the present invention. Unless defined otherwise, all technical and scientific terms used herein have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" as used herein are not intended to refer to any single embodiment of the particular invention but encompass all possible embodiments as described in the specification and the claims.

The term "about" as used herein refers to slight variations in numerical quantities with respect to any quantifiable variable. One of ordinary skill in the art will recognize inadvertent error can occur, for example, through use of typical measuring techniques or equipment or from differences in the manufacture, source, or purity of components. The claims include equivalents to the quantities whether or not modified by the term "about."

The term "configured" describes an apparatus, system, or other structure that is constructed to perform or capable of performing a particular task or to adopt a particular configuration. The term "configured" can be used interchangeably with other similar phrases such as constructed, arranged, adapted, manufactured, and the like.

Terms characterizing a sequential order (e.g., first, second, etc.), a position (e.g., top, bottom, lateral, medial, forward, aft, etc.), and/or an orientation (e.g., width, length, depth, thickness, vertical, horizontal, etc.) are referenced according to the views presented. Unless context indicates otherwise, these terms are not limiting. The physical configuration of an object or combination of objects may change without departing from the scope of the present invention.

As would be apparent to one of ordinary skill in the art, mechanical, procedural, or other changes may be made without departing from the spirit and scope of the invention. The scope of the invention is defined only by the appended claims, along with the full scope of equivalents to which such claims are entitled.

According to exemplary aspects of the various embodiments shown and disclosed throughout the present application, systems, apparatus, and/or methods for continuously washing and hydrating food product, such as broken and whole grain rice are provided. The food product, such as grain rice that can be glutinous and/or regular, is washed and hydrated to increase moisture content and according to any of the embodiments disclosed herein, the moisture content of the food product can be increased from approximately 10% moisture to 30-50% moisture by soaking it in water for 30-60 minutes. According to any of the aspects and/or embodiments disclosed and described herein, the apparatuses, systems, and/or methods provided include mass flow, continuous movement of the food product through the process in a vessel, which reduces the amount of time required to wash and hydrate the food product, while more efficiently utilizing an amount of water or other liquid, providing a more efficient and water preserving process.

Accordingly, FIGS. 1-4 disclose an exemplary rice hydration system 10. As shown in the figures, the system 10 includes a vessel 12. The vessel 12 shown is a columnar and includes an upper washing section 14, which is generally cylindrically shaped. Furthermore, the vessel may comprise 316L SS or similar material. The cylindrical washing section 14 is configured to receive an amount of food product, e.g., rice. The rice can be added to the vessel 12 via an inlet 16 (see, e.g., FIG. 2), which is positioned at a generally apex portion of the washing section 14. However, the position of the inlet 16 is not to be limiting to the vessel 12, and the inlet can be positioned generally anywhere to allow for the rice or other food product to be added to the washing section 14 of the vessel 12. A sight glass 15 is included through a side wall of the washing section 14 to allow for a view to the interior of the said washing section 14. The sight glass 15 includes a window, sensor, gauge, or other mechanism that allows for viewing, checking level of food product and soaking liquid or acquiring information inside said washing section 14. Furthermore, the position, location, and number of sight glass(es) 15 may be varied according to different embodiments of the vessel 12, and the exact position of that shown in the figures is not to be limiting thereto.

Figure 2:
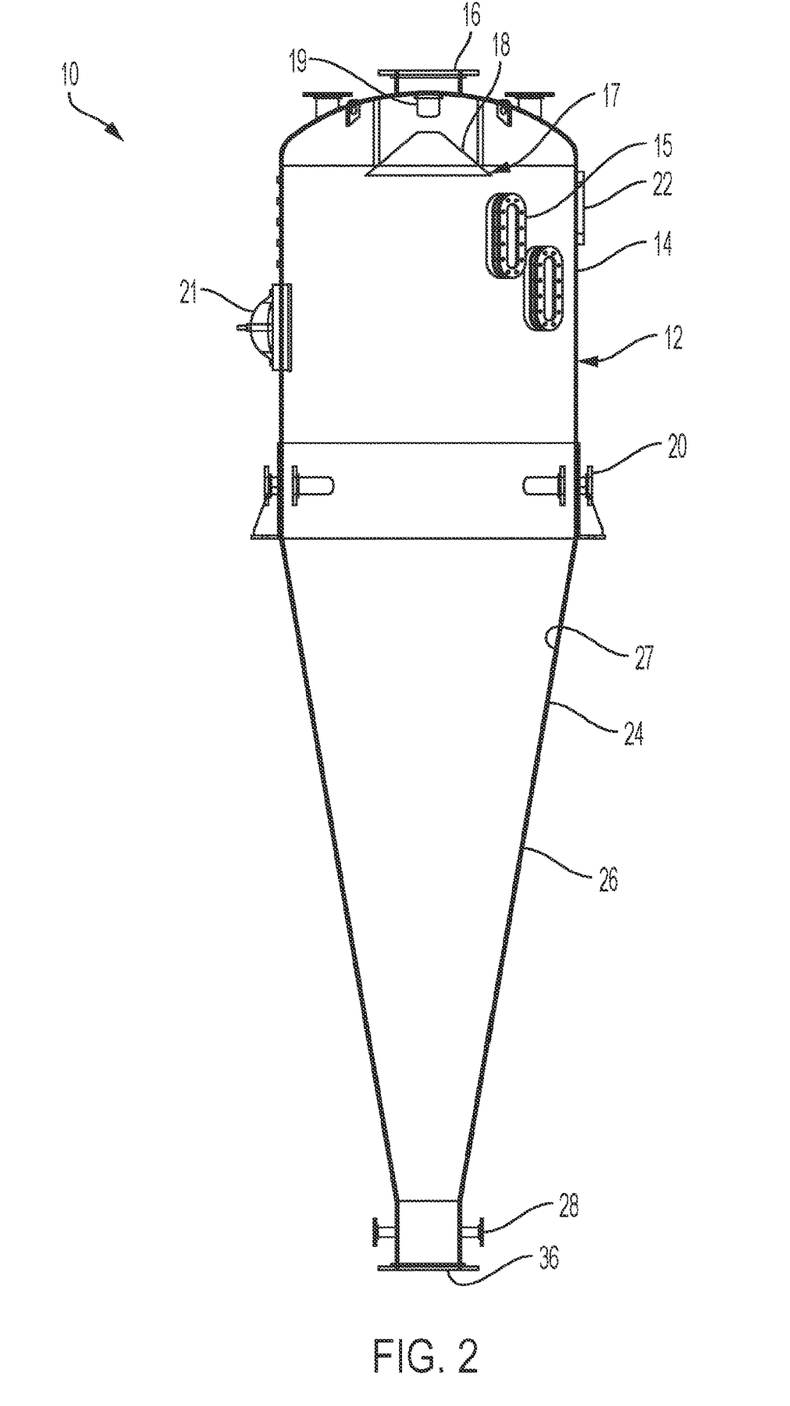
FIG. 2 is front elevation view of the vessel used for washing and hydrating food products.
Figure 3:
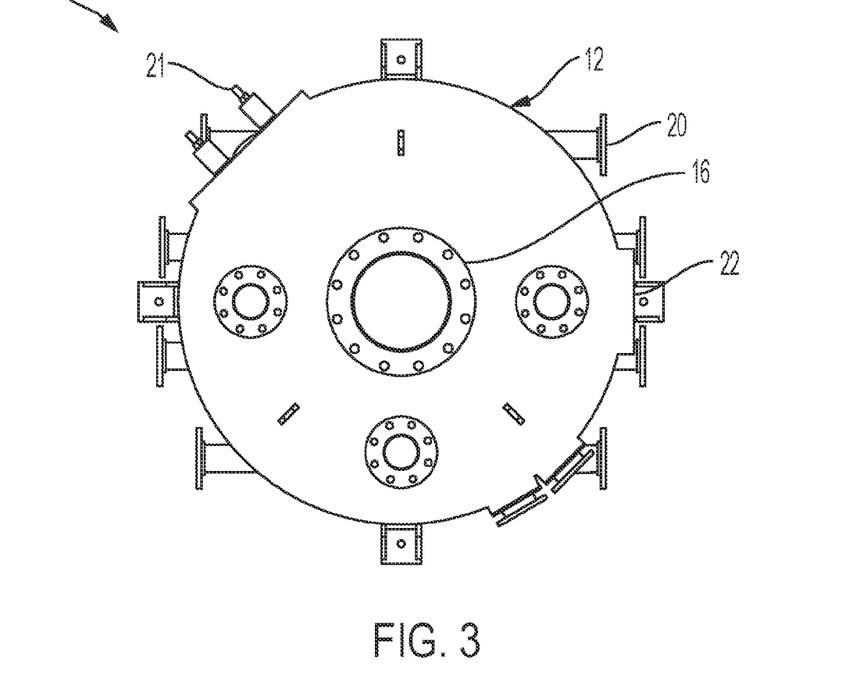
FIG. 3 is a top plan view of the vessel of FIG. 2.
Figure 4:
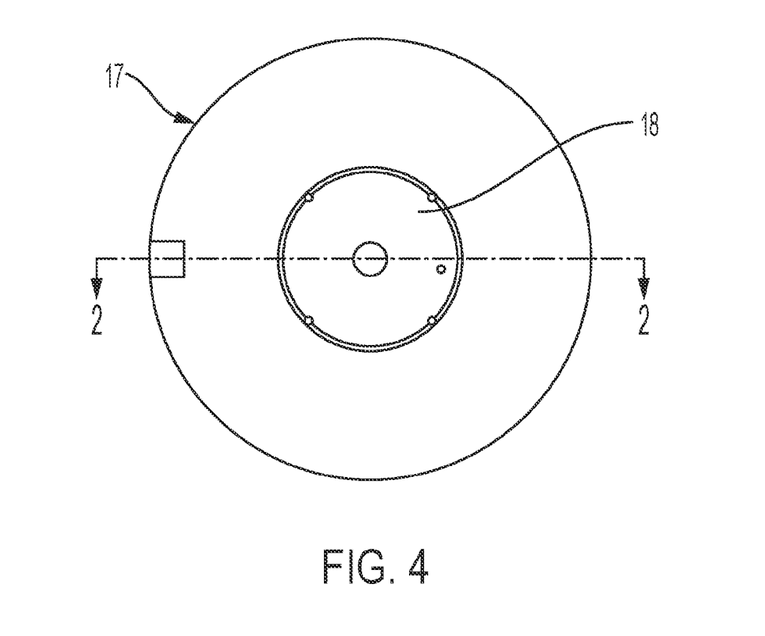
FIG. 4 is a bottom plan view of the vessel of FIG. 2.

Shown best in FIG. 2 generally adjacent the inlet 16 is a deflector 17. The deflector 17, which may be also referred to as a rice deflector, is utilized to spread the rice about the interior of the washing section 14 of the vessel 12. The deflector 17 includes a deflector shield 18 (see, e.g., FIGS. 2 and 4) and one or more connectors or hangers 19. The hangers 19 connect the deflector shield 18 to an internal portion of the vessel 12 and can be varied according to length and width between. The deflector shield 18 comprises a generally inverted conical member in which the sidewalls are sloping downward and away from the inlet 16 of the washing section 14. This allows the rice that is inputted into the vessel 12 to be scattered towards the outer portions of the washing section 14 to more efficiently wash said rice therein. However, it should be appreciated that the exact shape, size, and location of the deflector shield 18 of the deflector 17 could be varied according to the amount of food product being added to the vessel 12, the type of food product being added, and/or the size of the food product being added. The rate of the addition of the food product may also be of importance in selecting the size and/or shape of the configuration of the deflector 17.

When the food product is rice, such as for the production of rice starch and/or rice flour, the continuous cleaning and hydration system 10 including the vessel 12 shown in the figures receives de-hulled and polished rice through the inlet 16 at or near the top of the vessel 12. Said rice then passes through the washing section 14 where is subjected to a slow, counter current flow of water fluidized with a distribution system of compressed air injectors. For example, a liquid inlet 28 is shown in the side of the vessel 12 at or near the washing section 14 thereof. The water inlet could also be at or near the bottom of the vessel 12, such as that shown at numeral 28 in FIG. 2. In either sense, the water that is added into the interior of the vessel 12 is combined with air or other gasses via the inlets 20 positioned generally around and about the vessel 12 near the washing section 14. The exact number and spacing of the injector inlets 20 may be be varied different than that shown in the figures. However, the air inlets 20 are to combine the gas (e.g., air) through the inlets 20 with the liquid (e.g., water) in the interior of the washing section 14 of the vessel 12 to provide said countercurrent flow. The countercurrent flow of the gas/liquid mixture in relation to the food product in the washing section 14 of the vessel 12 will allow for the food product to be thoroughly cleansed therein. The counterflow provides sufficient turbulence to wash the food product and to make sure that the surface area of the food product is fully washed. As the water or other fluid and the air or other gas is mixing with the food product, the mixture can acquire dust or other impurities from the food product. Therefore, the mixture of the gas and liquid are continued to be moved to move the dirty water and air mixture towards and out of the vessel 12 via an outlet port 22. The outlet port 22 may be a screened overflow outlet port to allow for the liquid and air combination including the dust or other impurities to be directed towards a cleansing process to rid the water or other fluid from as many impurities as possible, so as to reuse the water in a subsequent wash cycle. The water could also be dispensed as waste water. Therefore, additional components, including but not limited to, pipes, screens, filters, and other processing components may be be utilized and are not shown exactly in the figures (not shown).

Positioned generally below and adjacent the washing section 14 is a hydration section 24 of the vessel 12. The hydration section 24 of the system 10 is a section to hydrate the food product for its intended endues (e.g., rice flour or rice starch or the like). For example, the washed rice, according to exemplary aspects of the disclosure, passes into the hydration section 24, where the countercurrent water flow continues, and to allow for the rice to expand and hydrate in the presence of the water. According to any of the embodiments disclosed herein, the hydration section 24 includes a generally frustoconical shape including angled walls 26 angling radially inward from a diameter at or near the washing section 14 and narrowing towards a lower end of the hydration section 24. The angled walls provide for the rice to move through the hydration in a mass flow manner. Mass flow provides that substantially all of the particles (i.e., rice) move through the section at substantially the same speed, which provides for similar hydration times for substantially all of the rice particles through the hydration section 24. The mass flow of the rice in the hydration section 24 is advantageous over batch hydration or funnel flow movement, as all of the particles i.e., all of the food product, will be moving at or near substantially the same speed. Such a movement allows for the food product to be in contact with the liquid for approximately the same time, allowing for all of the granules of food product or rice to be hydrated uniformly or approximately the same. The movement can be controlled by the configuration of the hydration section 24, including, in part, the angle of the walls 26. This will allow for the rice to be maintained in contact with the liquid for the needed time to fully hydrate, while reducing over hydration or under hydration thereof by controlling how much time the rice is maintained in the liquid before moving from and beyond the hydration section.

According to any of the embodiments disclosed herein, the slope of the angled walls 26 of the hydration section 24 is approximately about 80° above the horizontal. However, it should be appreciated that the angle of the walls can be between about 45° and less than about 90°. Therefore, while the 80° is shown and described herein, it should be appreciated that this is not limiting and generally any angle that allows for the mass flow of the food product through the hydration section is to be considered a part of the disclosure in any or all of the embodiments disclosed herein. The mass flow of the food product will also reduce the amount of water required to hydrate over batch or other hydration methods, as will be appreciated by those skilled in the art. To further aid in the movement of the rice through the hydration section 24, the walls 26 may be be polished and/or treated, such as to comprise polished walls 27, which can reduce the friction of the rice moving at or near the walls. The walls may be polished and/or coated at the inner surface thereof such that the rice does not get caught up or hung up along the walls to aid in the mass flow of all of the food product/rice through the hydration section to reduce the amount of hydration time and to efficiently utilize the water therein.

A water inlet, such as that shown by numeral 28 in the figures, can be utilized to create a countercurrent flow through the hydration section 24 to hydrate the food product moving via mass flow therethrough. In addition, the water or other liquid source can be treated with food grade biological inhibitors to ensure that there is a mitigation of the proliferation of yeast, mold, and/or bacteria. While biological inhibitors have been specifically mentioned, it should be appreciated that the water can be treated with any addition to improve the hydration and/or mitigate the proliferation of any unwanted component of the food product passing through the hydration section 24.

The design of the vessel, as has been disclosed, is chosen of the proper or ideal angle and surface finish to allow for a mass flow design, as opposed to a funnel flow. The mass flow design, as has been disclosed, ensures a uniform residence time of the rice or other food product in the hydration section, which provides for adequate hydration while efficiently utilizing the water or other liquid. Once the rice has flowed via the mass flow through the hydration section 24, it is released through an outlet 36. This may be also be referred to as a hydrated rice outlet 36.

At or near the rice outlet 36, a device to meter the outlet flow of the rice is provided. For example, according to any of the embodiments disclosed, a metering valve 34 can be included as part of the system 10 to meter the outflow of the rice from the hydration section 24. The metering valve ensures minimal water discharges with the rice, or otherwise controls the amount of water released with the rice. Thus, the rice may be outlet via a rice cake, slurry, or other configuration.

Figure 1:
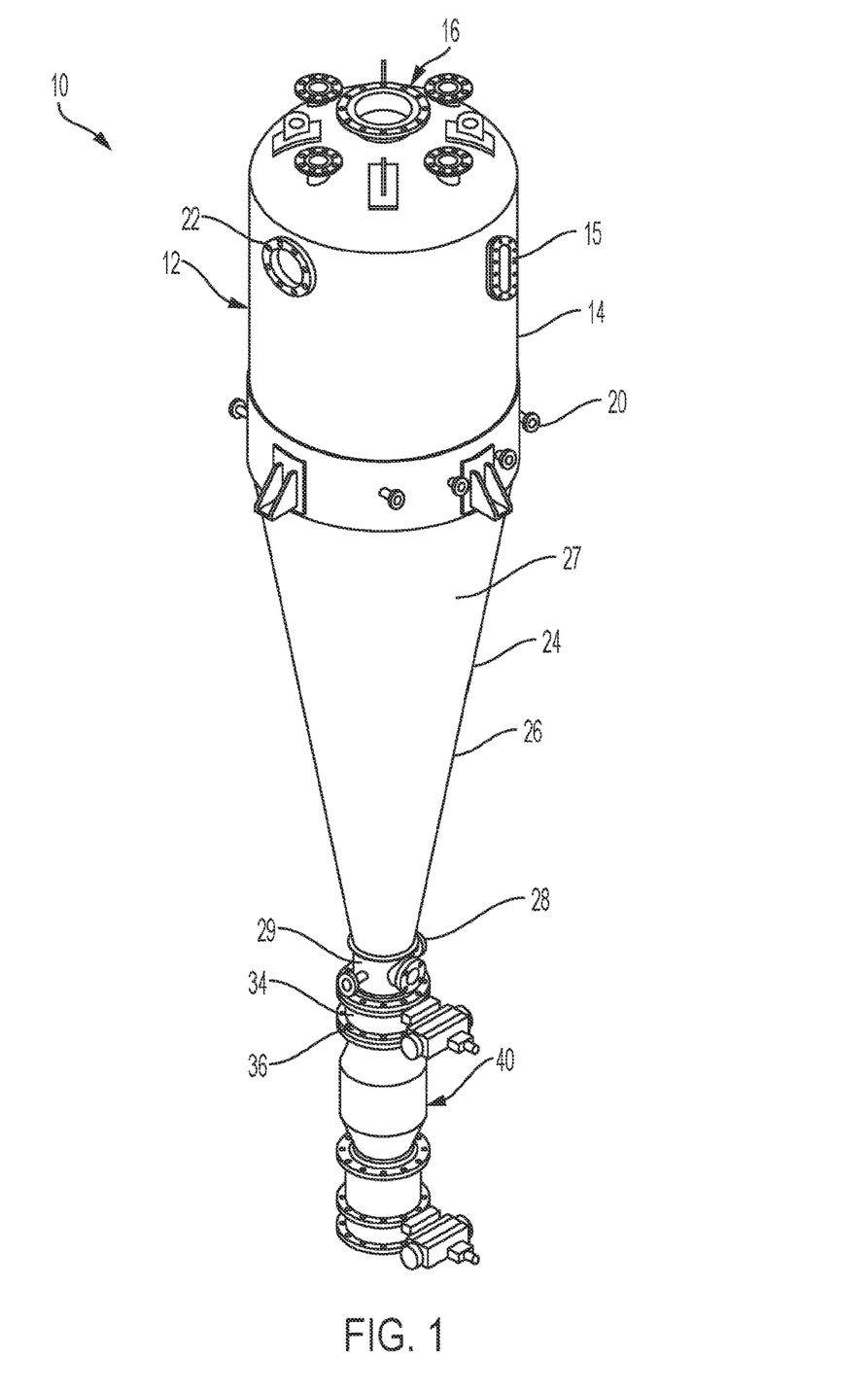
FIG. 1 is a perspective view of a vessel used for washing and hydrating food products according to aspects of the disclosure.
Figure 5:
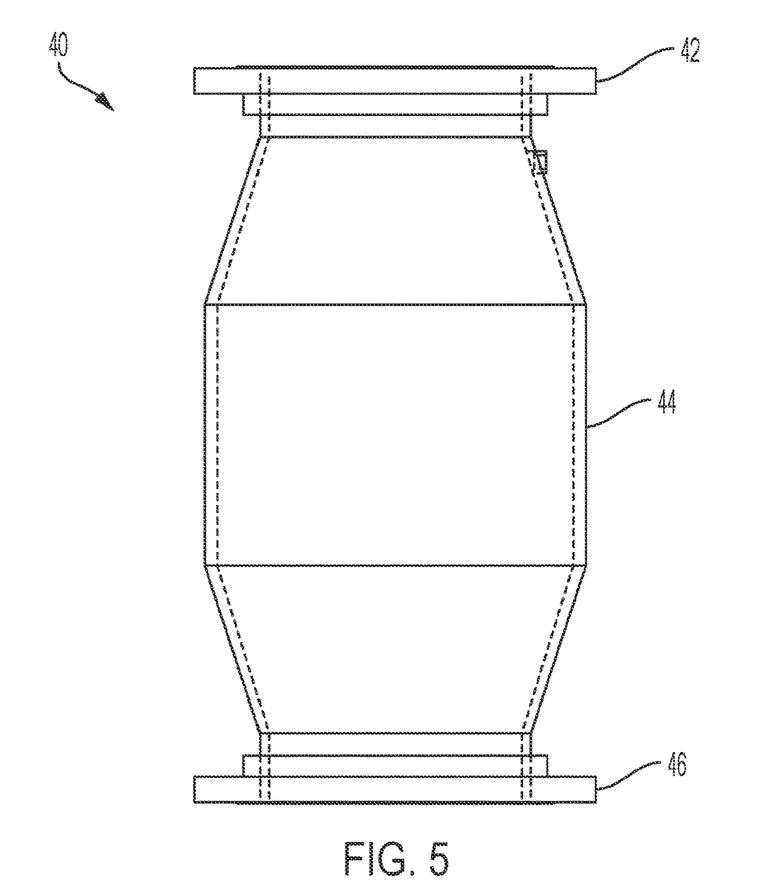
FIG. 5 is front elevation view of an accumulator chamber for use with a vessel used for washing and hydrating food products according to aspects of the disclosure.
Figure 6:
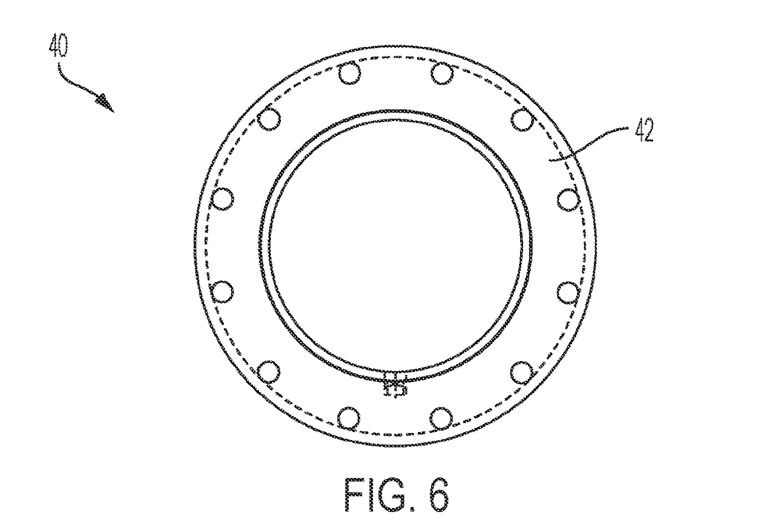
FIG. 6 is a top plan view of the accumulator of FIG. 5.

The rice can then be moved onto a next step. As shown in FIG. 1, an accumulator 40 is provided to receive the hydrated rice. The accumulator is shown in greater detail in FIGS. 5 and 6. According to any of the embodiments disclosed, the accumulator 40 includes a body 44 between an upper flange 42 and a lower flange 46. The upper flange 42 can be used to connect the accumulator to the vessel 12. The lower flange 46 may be used to connect the accumulator to another device, such as the food product may passed thereto. The accumulator body is sized and shaped to receive the food product and to store said food product until such time as it is time to be passed for additional processing or other intended uses. It should be appreciated that the size, shape, and/or configuration of the accumulator may be be varied differently than that shown in the figures, and that the accumulator is shown is for exemplary purposes.

Once the rice has discharged from the hydration section 24, it can be dewatered and washed with fresh makeup water across a dewatering screen. The water can then be recycled into the vessel and reused such as to minimize water usage, thus preserving and efficiently utilizing the water.

While it has been disclosed that the rice is metered from the hydration section with minimal water, it should be appreciated that some water will still be released with the rice. A metering valve can control the release of the rice to ensure that excess water is not released with the rice and to efficiently allow for the passage of the rice with minimal water needed. According to any of the embodiments disclosed, the metering valve 34 can comprise a pneumatic valve to control the water output and to conserve water as the rice is outputted from the vessel. According to any of the embodiments disclosed, a double dump airlock with a half metering valve assembly and accumulator may be utilized as the metering and accumulation mechanism for the rice from the hydration section. However, this should not be limiting, and any valve that would help avoid significant leakage of water may be utilized. Once the metered amount of product has been released, the slurry of the hydrated food product and water can be moved to the next unit of operation, and/or to future processing thereof.

Figure 7:
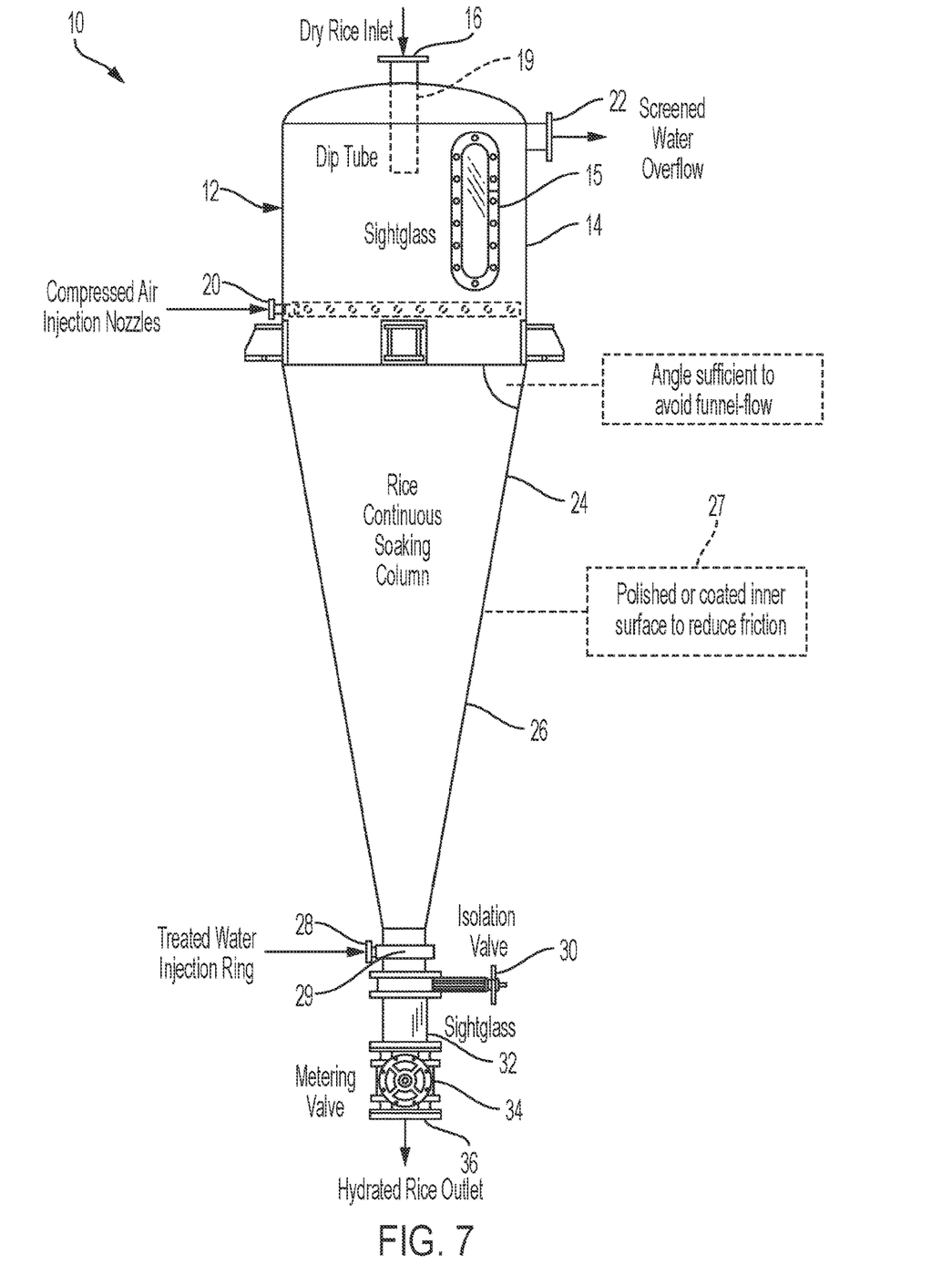
FIG. 7 is a schematic view of a vessel used for washing and hydrating food products according to aspects of the disclosure.

FIG. 7 is yet another schematic view of a vessel 12 of a rice system 10 for washing and hydrating food products, such as rice. The vessel 12 and system 10 shown in FIG. 7 is somewhat similar to that previously shown and described, and includes some additional details of aspects of the system 10 and/or vessel 12. For example, the inlet 16 is shown at or near the upper portion of the washing section 14 of the vessel 12. The washing section 14 is shown to be generally cylindrically shaped. The washing section also includes a dip tube 19 which is shown in replacement of the deflector shield 18, which can be utilized to allow for the input of the rice into the washing section 14. A sight glass 15 is shown at and through a side wall of the washing section 14 to allow for viewing, sensing, and/or gauging in two said washing section 14. Compressed air injection nozzles 20 are shown to be spaced circumferentially about the washing section 14 generally at a lower end thereof. The air from the air injection nozzles 20 will mix with liquid (e.g., water) in the washing section to provide a countercurrent flow in the washing section, which provides for agitation of the rice therein to fully wash said rice. The water and air mixture that has mixed with the particles on the rice and is now considered dirty can be outputted via the screened water overflow 22 for processing and potential reuse in the washing section of a future washing.

The washed rice is then allowed to move on to the hydration section 24 of the vessel 12. As noted, the hydration section 24 includes angled walls that are sufficient to substantially avoid funnel flow and to provide for a mass flow movement of the rice through the hydration section. The hydration section 24 may be considered a continuous soaking column wherein the mass flow of the rice or other food product mixes with a liquid therein to hydrate said food product in an efficient manner. The walls may also include a polished or coated inner surface 27 to reduce friction of the rice moving therethrough. The water in the hydration section 26 may be treated with inhibitors or other treatments via an inlet 28 to reduce or otherwise mitigate the proliferation of the build-up of yeast, bacteria, or other unwanted growth in the food product.

Once the mass flow of the food product has allowed for sufficient hydrating thereof, the rice and water can then be moved towards a metering valve 34 and outlet 36. An isolation valve 30 is provided to control the movement of the food product into the metering valve. A sight glass 32 allows for a visual, sensing, and/or gauging into the system to ensure that the food product is moving as desired. A metering valve 34, such as previously shown in and/or described, provides for the food product to release via the outlet 36 with a controlled amount of water, so as to preserve the water for the future hydration cycles.

Therefore, the system 10 provides numerous advantages over previous batch processes for washing and/or hydrating food product. There is continuous cleaning via an air assisted, countercurrent, water scouring section in the washing section 14 to minimize water usage. For example, the addition of air with the water in the counter current manner provides for agitation of the water and food product to quickly and efficiently wash the food product. The continuous hydration via the mass flow in the hydration section 24 improves mobility for further processing in rice starch and rice flour production. In addition, the mass flow vessel design allows for constant rice residence time and stable outlet moisture. The use of a metering valve or other mechanism provides for metered rice discharge at or near the bottom of the vessel 12. In addition, bacterial control during the hydration can be provided such as by injecting a variety of biological inhibitors, which can include but is not limited to, hydrogen peroxide, ozone, peracetic acid, or other biocides.

The use of the air inlet to provide a counter current air and water flow provides improvements in the cleaning of the food product in the washing section 14. This allows for reduced washing time and the minimal use of water required to wash said food product. A vertical frustoconical column with a metering rotating valve allows for continuous, mass flow-controlled emptying of the hydration column after enough time to hydrate the rice has passed. As disclosed, in mass flow, all particles move at substantially the same time, allowing for the continuous movement of the food product in the hydrating liquid. The use of the water in such a manner and with a metering valve allows for the water to be recycled when the rice is moved on to future processing, such as milling. Another key advantage is the unitary wash and hydration column design allows for the reduced water usage with metered mass flow along for a limited water loss. The rice can be exited via the outlet either in rice cake or slurry mixtures, depending on the amount of water required.

Figure 8:
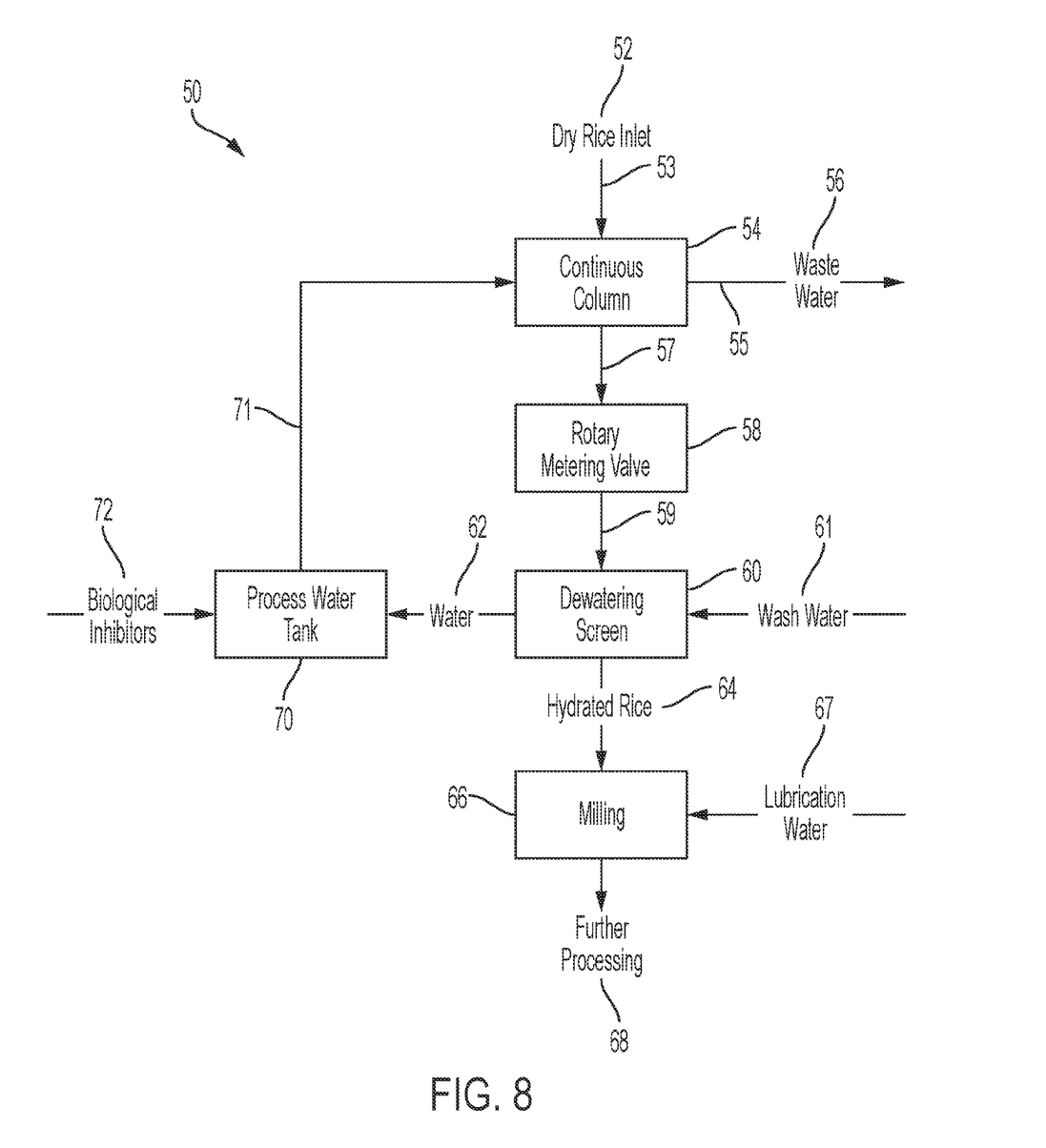
FIG. 8 is a schematic diagram of a process for washing and hydrating food products according to aspects of the disclosure.
Figure 9:
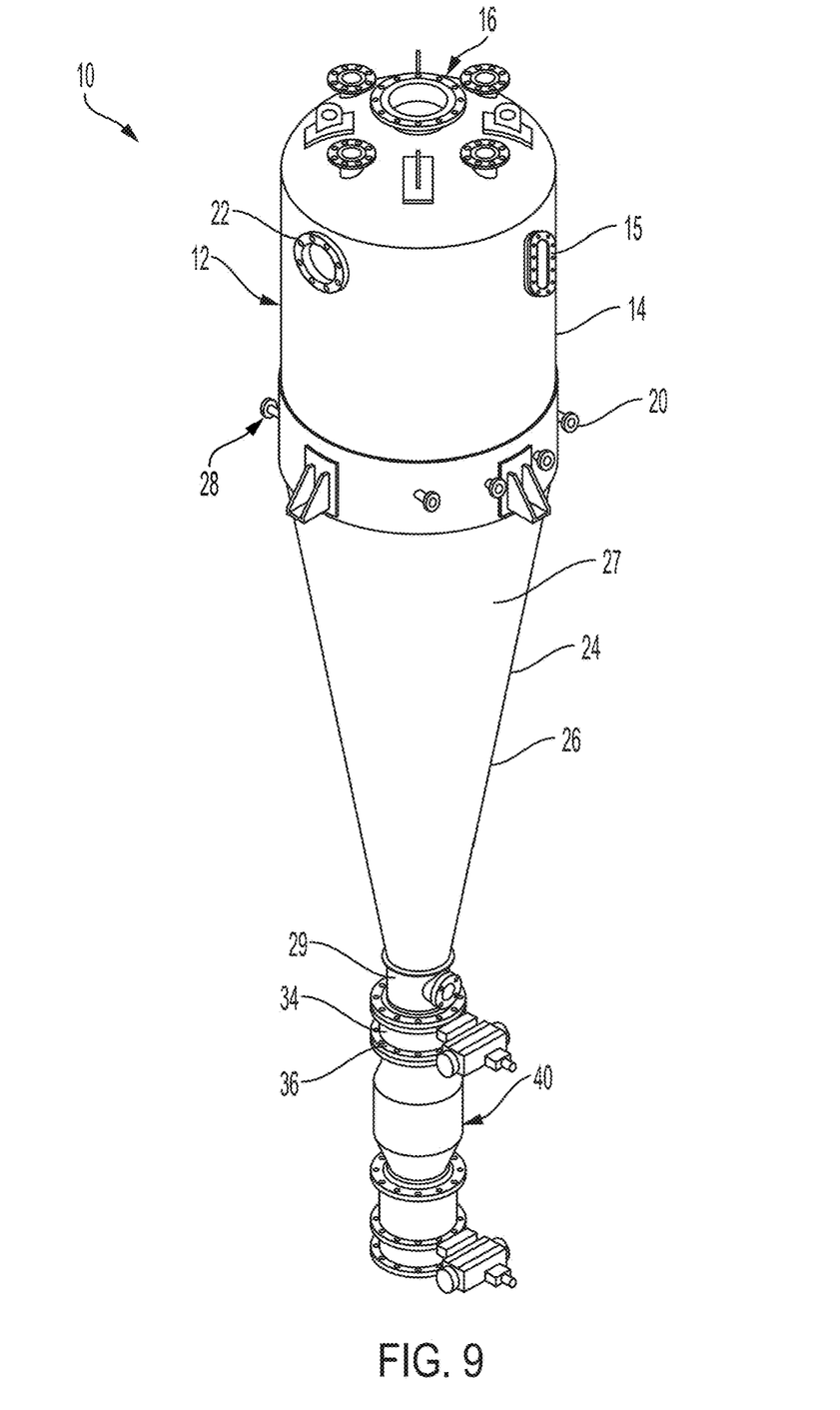

FIG. 8 is a schematic diagram of a process for washing and hydrating food products according to any of the embodiments disclosed herein. While the process shown in the diagram of FIG. 8 can utilize any of the embodiments, components, and/or features disclosed in any of the figures and/or descriptions herein, it should be appreciated that the process can be generically used with items of different configuration, but which provide for the same or similar advantages and improvements over that which is currently known.

In operation, and according to the system 50 shown in FIG. 8, the process will be described with regard to the food product of rice, such as rice used for rice starch and/or rice flour. At step 52, dry rice is added via the inlet of the system 50. As noted, this system may include such vessel design as it previously disclosed and including such inlet at or near a washing section thereof. The arrow 53 provides for the direction of the rice into the continuous column 54 which may be of the design of the vessel 12 including an upper washing section 14 and a lower frustoconical hydration section 24. At a first stage of the continuous column, air agitates water in a countercurrent flow at or near the top of the column to improve washing of the rice that has been added into the washing section of the column 54. Overflow water, which may contain dust or other impurities, exits via the arrow 55 as waste water 56. The rice settles and moves into and through a hydration section via gravity. The hydration section of the vessel is designed to provide metered mass flow, which ensures that the rice resides in the hydration section long enough to hydrate. According to some exemplary designs, the hydration can be done in approximately 15 minutes, but the rice may be held therein for an unlimited time, including up to or more than six hours. After the rice has hydrated in the column 54, the rice moves via the arrow 57 towards and through a rotary metering valve 58. The valve provides a metered exit at an outlet of the column 54 such that there is a minimal use of water with the rice at the exit.

The exiting rice via the metering valve 58 is exited via as shown by the arrow 59. Said rice may include an amount of water and can be considered a cake, slurry, or other mixture of rice and water. Such a mixture is passed into a dewatering screen 60 to remove the water therefrom. Wash water 61 is added through the screen and the water is moved via the arrow 62 from the screen 60. The hydrated rice from the dewatering screen is shown at the arrow 64. The hydrated rice 64 can then be used for further processing, such as milling shown by the box 66. Lubrication water 67 can be added to the milling process to aid in the processing of the hydrated rice 64. After the milling has occurred, further processing can take place such as that shown by the arrow 68. Thus, the rice can then be used for flour, starch, or other purposes.

As further shown in FIG. 8, the water 62 that has passed through the dewatering screen can be added to a process water tank 70. Biological inhibitors 72 can be added to the process water tank to treat the water, and said treated water can be used as shown by the arrow 71 to be added to the continuous column 54 for washing and/or hydrating purposes. Therefore, the use of the water is recycled through the system so as to reduce the amount of wastewater for the process.

Additional advantages of the system are the reduction and efficient use of the water for the washing and/or hydrating purposes. For example, previous batch soaking uses 1.8 to 2-cubic meters of water for two metric tons of rice. The new technology (i.e., the continuous column design as disclosed herein) set up for 10% higher than the required flow for hydration which is only 1.45-cubic meters of water for every 2 metric tons of rice which is a 19-27% reduction in the water usage. Therefore, the use of the continuous column wash and hydration system as shown and described provides for an approximately 25% reduction in the amount of the water utilized to wash and hydrate rice. This is but another improvement over that which is currently known.

In addition, the following examples provide for exemplary results for the use of hydrating both broken polished glutinous rice and whole grain glutinous rice utilizing a continuous column as shown and described herein. The examples provided are not to be limiting to the invention, and are intended to be used for support of the aspects of the invention, including the success thereof.

Example 1

Hydration of Broken Polished Glutinous Rice

A vessel with 0.28 m cylindrical section height and 0.65 meter conical section height and 0.28 meter diameter was manufactured. The continuous broken polished glutinous rice hydration experiment was conducted using 25.7 liter water and 6.43 kg broken rice soaked for 15 minutes in the vessel. After 15 minutes, air was bubbled into set up at flow rate 0.140 m3/hr. Water was fed at 0.300 l/min and broken rice was fed at a rate of 0.350 kg/min. These settings resulted in a soaking time of 40 minutes for broken rice inside vessel. The hydrated rice was discharged periodically through bottom port using a valve. Periodic measurement of moisture content of broken rice was performed.

TABLE 1

Hydration of Glutinous Broken Rice

| Sample | Rice Feed Rate g/min | Soaking Time, min | Moisture % |
|---|---|---|---|
| 1 | — | 0 | 11.56 |
| 2 | 350 | 15 | 38.28 |
| 3 | 350 | 30 | 38.75 |
| 4 | 350 | 60 | 40.50 |
| 5 | 350 | 90 | 41.73 |
| 6 | 350 | 120 | 38.60 |
| 7 | 350 | 150 | — |
| 8 | 350 | 180 | 41.44 |
| 9 | 350 | 210 | 41.41 |
| 10 | 350 | 240 | 40.06 |

Example 2

Hydration of Whole Grain Glutinous Rice

Using the apparatus and recipe described in example 1, whole grain glutinous rice is hydrated. Moisture analysis of samples is shown in table 2.

TABLE 2

Hydration of Glutinous Whole Grain Rice

| Sample | Rice Feed Rate g/min | Soaking Time, min | Moisture % |
|---|---|---|---|
| 1 | — | 0 | 13.28 |
| 2 | No Feed | 40 | 37.25 |
| 3 | 350 | 30 | 37.88 |
| 4 | 350 | 60 | 37.99 |
| 5 | 350 | 90 | 35.98 |
| 6 | 350 | 120 | 39.56 |
| 7 | 350 | 150 | 37.69 |

Therefore, the present disclosure is not to be limited to particular embodiments described herein. It should be appreciated that a novel system, apparatus, and/or method for washing and hydrating a food product, such as rice, has been shown and described herein. The systems, methods, and/or apparatus disclosed herein provide numerous advantages including improved wash and hydration times, reduction of the amount of water required, and/or treatment to the food product during the wash and/or hydration steps in order to provide ideal or improved food products for processing. Variations to any of the systems, methods, and/or apparatus as would be obvious to those skilled in the art are to be considered part of the present disclosure. In addition, it should be appreciated that any of the components of any of the figures can be interchanged with any of the other components of the other figures to provide embodiments not explicitly shown and/or described herein, which are included and intended as part of the spirit and coverage of the disclosure.

The invention claimed is:

1. A system for washing and hydrating food product, the system comprising: a vessel, comprising:
   a washing section including an inlet to receive the food product;
   a hydration section adjacent the washing section, said hydration section having angled walls that are generally frustoconical;
   a metered outlet; and
   a liquid inlet and an air inlet each operatively connected to the washing section of the vessel to add an air and liquid mixture thereto;
   wherein the liquid inlet and air inlet are configured so that the air and liquid mixture flow in a countercurrent direction relative to the food product as the food product moves towards the hydration section to create a turbulent flow in the washing section and wash the food product; and
   wherein the food product is a grain food product.

2. The system of claim 1 wherein the walls of the generally frustoconical hydration section of the vessel are angled at between about 45 degrees to about 90 degrees so that the grain food product moves through the hydration section in a continuous, mass-flow manner.

3. The system of claim 1, wherein the walls of the generally frustoconical hydration section of the vessel are angled at about 80 degrees.

4. The system of claim 1 wherein the walls of the generally frustoconical hydration section of the vessel are angled so that the grain food product moves through the hydration section in a continuous, mass-flow manner.

5. The system of claim 1, wherein the washing section comprises a generally cylindrical shape.

6. The system of claim 1, wherein the washing section comprises an outflow port including a screen.

7. The system of claim 1, wherein the liquid and air inlet comprises a compressed air injection nozzle.

8. The system of claim 1, wherein the metered outlet of the vessel comprises a metering valve.

9. The system of claim 1, wherein the walls of the generally frustoconical hydration section of the vessel comprise an inner surface that is polished or coated to reduce friction of the food product moving therein.

10. A method for washing and hydrating a food product, the method comprising:
    adding food product to a wash chamber of a vessel;
    introducing a flow of fluidized water to the wash chamber of the vessel in a countercurrent flow as the food product moves towards a hydration chamber of the vessel;
    introducing a treated water to the food product in the hydration chamber as the food product moves in a mass flow manner through the hydration chamber; and
    metering a flow of the food product out an outlet of the vessel;
    wherein the method further comprises recycling the fluidized water from the wash chamber by passing the fluidized water through an outlet in the wash chamber, said outlet including a screen.

11. The method of claim 10, further comprising adding one or more biological inhibitors to the treated water that is introduced to the food product in the hydration chamber.

12. The method of claim 10, wherein the hydration chamber comprises a vertical frustoconical column to allow for a continuous, mass-flow controlled movement of the food product.

13. The method of claim 10, further comprising dewatering and washing the food product that has been metered out the outlet of the vessel before further processing of the food product.

14. A vessel, comprising:
    a generally vertical chamber having a cylindrical wash section at least partially above a hydration section;
    wherein the wash section comprises an inlet for receiving a food product and an inlet for introducing a fluidized liquid into the wash section to create a turbulent flow therein;
    wherein the hydration section is adjacent to the wash section and comprises a generally frustoconical shape having a larger diameter at an upper portion adjacent the wash section for receiving the washed food product, a smaller diameter opposite the wash section at an outlet of the hydration section, and a treated liquid inlet for introducing a treated liquid into the hydration section; and
    wherein the walls of the generally frustoconical hydration section of the vessel are angled so that the grain food product moves through the hydration section in a continuous, mass-flow manner.

15. The vessel of claim 14, wherein the generally frustoconical shape of the hydration section of the vessel comprises walls angled at between about 45 degrees to about 90 degrees.

16. The vessel of claim 14, wherein the walls are angled at about 80 degrees.

17. The vessel of claim 14, wherein the wash section is generally cylindrical in shape and includes a screened outlet port.

* * * * *